US011273490B2

(12) United States Patent
Kuse et al.

(10) Patent No.: US 11,273,490 B2
(45) Date of Patent: Mar. 15, 2022

(54) FE-BASED METAL POWDER FOR MOLDING

(71) Applicant: Sanyo Special Steel Co., Ltd., Himeji (JP)

(72) Inventors: Tetsuji Kuse, Himeji (JP); Shingo Fukumoto, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 18 days.

(21) Appl. No.: 16/758,949

(22) PCT Filed: Oct. 9, 2018

(86) PCT No.: PCT/JP2018/037586
§ 371 (c)(1),
(2) Date: Apr. 24, 2020

(87) PCT Pub. No.: WO2019/082638
PCT Pub. Date: May 2, 2019

(65) Prior Publication Data
US 2021/0178467 A1 Jun. 17, 2021

(30) Foreign Application Priority Data
Oct. 27, 2017 (JP) .............................. JP2017-207885

(51) Int. Cl.
*B22F 1/00* (2006.01)
*B22F 10/28* (2021.01)
*B33Y 10/00* (2015.01)
*B22F 1/05* (2022.01)
*B33Y 70/00* (2020.01)
*B33Y 80/00* (2015.01)
*B22F 10/64* (2021.01)
*C22C 38/10* (2006.01)
*C22C 33/02* (2006.01)
*C22C 38/08* (2006.01)
*C22C 38/06* (2006.01)
*C22C 38/12* (2006.01)
*C22C 38/14* (2006.01)
*B22F 7/00* (2006.01)
*B22F 3/24* (2006.01)

(52) U.S. Cl.
CPC ............... *B22F 1/05* (2022.01); *B22F 7/008* (2013.01); *B22F 10/28* (2021.01); *B22F 10/64* (2021.01); *B33Y 10/00* (2014.12); *B33Y 70/00* (2014.12); *B33Y 80/00* (2014.12); *C22C 33/0285* (2013.01); *C22C 38/06* (2013.01); *C22C 38/08* (2013.01); *C22C 38/105* (2013.01); *C22C 38/12* (2013.01); *C22C 38/14* (2013.01); *B22F 2003/248* (2013.01); *B22F 2301/35* (2013.01); *B22F 2304/10* (2013.01)

(58) Field of Classification Search
None
See application file for complete search history.

(56) References Cited

U.S. PATENT DOCUMENTS

| 4,098,607 | A | 7/1978 | Rizzitano et al. |
| 4,443,254 | A | 4/1984 | Floreen |
| 4,941,927 | A * | 7/1990 | Hickey, Jr ............ B23K 20/04 148/522 |
| 5,466,276 | A | 11/1995 | Sato et al. |
| 7,981,521 | B2 | 7/2011 | Bailey et al. |
| 10,920,295 | B2 * | 2/2021 | Tuffile .................... C22C 38/02 |
| 2011/0236721 | A1 * | 9/2011 | Bailey .................... C22C 38/08 428/683 |
| 2013/0065073 | A1 * | 3/2013 | Fuwa ..................... C22C 38/105 428/548 |
| 2016/0251736 | A1 * | 9/2016 | Shimizu .................. C22C 38/04 419/7 |
| 2020/0261971 | A1 * | 8/2020 | Brewer ................. B22F 1/0085 |

FOREIGN PATENT DOCUMENTS

| CN | 106825566 A | 6/2017 |
| EP | 0051401 A1 | 5/1982 |
| JP | H559500 | 3/1993 |
| JP | 2008185183 A | 8/2008 |
| JP | 4661842 B2 | 1/2011 |
| JP | 2013253277 A | 12/2013 |
| JP | 201725392 A | 2/2017 |
| WO | 2007027724 A2 | 3/2007 |

OTHER PUBLICATIONS

Fathy, Ayman, et al. "Mechanical properties of new low-nickel cobalt-free maraging steels." Steel research 73.12 (2002): 549-556. (Year: 2002).*
Shamantha, C. R., et al. "Microstructural changes during welding and subsequent heat treatment of 18Ni (250-grade) maraging steel." Materials Science and Engineering: A 287.1 (2000): 43-51. (Year: 2000).*
Siebein, Kerry N. Microstructural Characterization of a Cobalt-Free Maraging Steel, Vasco MaxT-250. Army Lab Command Watertown MA Material Technology Lab, 1987. (Year: 1987).*
He, Yi, et al. "Age hardening and mechanical properties of a 2400 MPa grade cobalt-free maraging steel." Metallurgical and Materials Transactions A 37.4 (2006): 1107-1116. (Year: 2006).*

(Continued)

Primary Examiner — Anthony M Liang
(74) Attorney, Agent, or Firm — The Webb Law Firm

(57) ABSTRACT

Provided is an Fe-based metal powder that is suitable for a process involving rapid melt-quenching and solidification, and that provides a shaped article having superior properties. The metal powder for shaping is made of an Fe-based alloy. The Fe-based alloy contains: Ni in an amount of 15.0% to 21.0% by mass; Co in an amount of 0% to 10.0% by mass; Mo in an amount of 0% to 7.0% by mass; Ti in an amount of 0.1% to 6.0% by mass; Al in an amount of 0.1% to 3.0% by mass; and the balance composed of Fe and incidental impurities.

9 Claims, No Drawings

(56) References Cited

OTHER PUBLICATIONS

"Material data sheet—FlexLine: EOS MaragingSteel MS1", 2007, Electrical Optical Systems Co.
Yue, "New Maraging Stainless Steels and Their Strength and Toughness", Harbin Polytechnic University Press, 2017, pp. 91-94. [Relevant for reasons stated in the Office Action translation].

* cited by examiner

FE-BASED METAL POWDER FOR MOLDING

CROSS-REFERENCE TO RELATED APPLICATIONS

This application is the United States national phase of International Application No. PCT/JP2018/037586 filed Oct. 9, 2018, and claims priority to Japanese Patent Application No. 2017-207885 filed Oct. 27, 2017, the disclosures of which are hereby incorporated by reference in their entirety.

TECHNICAL FIELD

The present invention relates to metal powder to be used in a rapid melt-quenching solidification process, such as a three-dimensional additive manufacturing method, a thermal spraying method, a laser coating method, and a surfacing method. The present invention more specifically relates to Fe-based alloy powder.

BACKGROUND ART

Three dimensional (3D) printers are used in manufacturing shaped metal articles. In these 3D printers, the shaped articles are manufactured by an additive manufacturing method. In the additive manufacturing method, spread metal powder is irradiated with a laser beam or an electron beam. This irradiation melts particles of the metal powder and the particles then solidify. Such particles are bonded to each other through the melting and the subsequent solidification. Irradiation is selectively applied to some portions of the metal powder. Unirradiated portions in the powder do not melt. Bonded layers can be formed only in the irradiated portions.

Additional metal powder is spread over the bonded layers. This metal powder is irradiated with a laser beam or an electron beam. This irradiation melts particles of the additional metal powder, and the particles then solidify. Such particles are bonded to each other through the melting and the subsequent solidification, and fresh bonded layers can be formed. The fresh bonded layers are also connected to the bonded layers formerly formed.

Repetition of the bonding by irradiation causes an aggregate of the bonding layers to gradually grow. Such stepwise growth produces a three-dimensional shaped article. A complicatedly shaped article can be readily produced by the additive manufacturing method. PTL 1 (JP4661842B) discloses an example additive manufacturing method.

Requirements for alloys used in structures for, for example, aircraft and space fields are high strength and high fatigue resistance. Maraging steel is suitable for such applications.

PTL 2 (JP2013-253277A) discloses maraging steel containing Fe, which is a main element, Ni, Co and Mo. The content of Co in the maraging steel is 7% by mass or more. The maraging steel also contains W. The maraging steel does not contain Ti.

PTL 3 (JP2008-185183A) discloses maraging steel containing Ni, Cr, Mo and Co. The maraging steel has undergone a nitriding treatment.

CITATION LIST

Patent Literatures

PTL 1: JP4661842B
PTL 2: JP2013-253277A
PTL 3: JP2008-185183A

SUMMARY OF INVENTION

In an additive manufacturing method, a metal material is rapidly melted and then quenched to solidify. Conventional maraging steel is not suitable for metal powder used in processes involving such rapid melt-quenching solidification. An Fe-based alloy has been demanded that is suitable for the additive manufacturing method and that can provide a shaped article having superior mechanical properties. Such an alloy is also useful in, for example, a thermal spraying method, a laser coating method, and a surfacing method.

An object of the present invention is to provide an Fe-based metal powder that is suitable for a process involving rapid melt-quenching solidification, and that can provide a shaped article having superior properties.

The present invention provides the following items:

[Item 1]

An Fe-based metal powder for shaping, wherein the Fe-based metal powder is made of an Fe-based alloy, comprising:
Ni in an amount of 15.0% to 21.0% by mass;
Co in an amount of 0% to 10.0% by mass;
Mo in an amount of 0% to 7.0% by mass;
Ti in an amount of 0.1% to 6.0% by mass;
Al in an amount of 0.1% to 3.0% by mass; and
the balance being Fe and incidental impurities.

[Item 2]

The Fe-based metal powder according to item 1, wherein the amount of Co in the Fe-based alloy is 0.5% by mass or less.

[Item 3]

The Fe-based metal powder according to item 1, wherein the amount of Co in the Fe-based alloy is 0.5% to 10.0% by mass.

[Item 4]

The Fe-based metal powder according to any one of items 1 to 3, wherein D50/TD is 0.2 to 20, the D50/TD being a ratio of a mean particle diameter D50 (μm) of the metal powder to a tap density TD ($Mg/m^3$) of the metal powder.

[Item 5]

A method of producing a shaped article using a raw Fe-based metal powder, comprising the steps of:
(1) providing Fe-based metal powder made of Fe-based alloy containing:
Ni in an amount of 15.0% to 21.0% by mass;
Co in an amount of 0% to 10.0% by mass;
Mo in an amount of 0% to 7.0% by mass;
Ti in an amount of 0.1% to 6.0% by mass;
Al in an amount of 0.1% to 3.0% by mass; and
the balance being Fe and incidental impurities, and
(2) melting and then solidifying the Fe-based metal powder to produce a non-heated shaped article.

[Item 6]

The method according to item 5, wherein the non-heated shaped article has a Rockwell hardness of 30 to 40.

[Item 7]

The method according to item 5 or 6, further comprising, subsequent to step (2), the step of:
(3) heating the non-heated shaped article to produce a shaped article.

[Item 8]

The method according to item 7, wherein step (3) comprises the substeps of:
(3-1) solutionizing the non-heated shaped article; and
(3-2) aging the solutionized shaped article.

[Item 9]

The method according to claim 8, wherein substep (3-1) is performed at a temperature of 700 to 900° C. for a period of 1.0 to 3.0 hours, and substep (3-2) is performed at a temperature of 450 to 550° C. for a period of 3.0 to 6.0 hours.

[Item 10]

The method according to any one of items 7 to 9, wherein the shaped article after step (3) has a Rockwell hardness of 50 to 60.

[Item 11]

The method according to any one of items 7 to 10, wherein the shaped article after step (3) satisfies the following expressions (I) and (II):

$$1.5 \leq (A_{TH}/A_{TR}) \times (C_{TH}/C_{TR}) \leq 3.5 \quad \text{(I), and}$$

$$1.5 \leq (B_{TH}/B_{TR}) \times (C_{TH}/C_{TR}) \leq 3.5 \quad \text{(II),}$$

where, $A_{TH}$ represents tensile strength at 400° C., $A_{TR}$ represents tensile strength at 25° C., $B_{TH}$ represents 0.2% proof stress at 400° C., $B_{TR}$ represents 0.2% proof stress at 25° C., $C_{TH}$ represents elongation at break at 400° C., and $C_{TR}$ represents elongation at break at 25° C.

A shaped article having superior properties can be produced from an Fe-based metal powder according to the present invention through a process involving rapid melt-quenching solidification.

DESCRIPTION OF EMBODIMENTS

General maraging steel contains substantially no C but contains alloying elements, such as Ni, Mo, Ti, and Co. In this maraging steel, intermetallic compounds, such as a $Ni_3Mo$ phase and a $Ni_3Ti$ phase are precipitated in a martensitic matrix. Such intermetallic compounds contribute to high hardness and high strength in the maraging steel.

Co lowers the solid solubility limit of Mo. Accordingly, martensite having a larger amount of Co contains a larger amount of supersaturated Mo. The addition of Co facilitates precipitation of a $Ni_3Mo$ phase in the martensite.

In contrast, a large amount of Co, which is an austenitizing element, inhibits martensitic transformation. The addition of a large amount of Co promotes the formation of a μ phase or a σ phase, and thereby causes embrittlement of the alloy. Furthermore, Co is subject to "Ordinance on Prevention of Hazards Due to Specified Chemical Substances", and the addition of a large amount of Co into Fe is not preferred from the viewpoint of compliance with the Ordinance. Under such circumstances, the amount of the Co additive should be preferably reduced. However, a steel having the reduced amount of Co barely leads to precipitation of the $Ni_3Mo$ phase, resulting in insufficient mechanical properties, such as hardness and strength.

The present inventors have found through intensive studies that the addition of predetermined amounts of Ni, Ti and Al into Fe can compensate for the addition of a small amount of Co. The present inventors have also found that a shaped article having superior mechanical properties can be provided through a process involving rapid melt-quenching solidification of raw Fe-based metal powder according to the present invention.

The Fe-based metal powder for shaping according to the present invention is an agglomerate of multiple particles. The material of the particles is an Fe-based alloy. The matrix structure of the Fe-based alloy is martensite. The Fe-based alloy contains Ni, Mo, Ti and Al, and may further contain Co. The balance in the alloy is Fe and incidental impurities. The function of each element in this alloy will be described in detail as follows.

[Cobalt (Co)]

As described above, Co is an optional element that inhibits the martensitic transformation. In the metal powder of the present invention, Co is not added, or a smaller amount of Co is contained when Co is added. It should also be noted that a trace amount of Co may be incidentally contained in the alloy even when Co is not added. The content of Co is preferably 10.0% by mass or less, more preferably 5.0% by mass or less, further more preferably 0.5% by mass or less, particularly more preferably 0.3% by mass or less. The content of Co may be substantially 0%. Accordingly, the content of Co is preferably 0% to 10.0% by mass, more preferably 0% to 5.0% by mass, further more preferably 0% to 0.3% by mass.

[Nickel (Ni)]

Ni is an essential element that forms an intermetallic compound with each of Mo, Ti and Al in the Fe-based alloy. Specific examples of the intermetallic compound include $Ni_3Mo$, $Ni_3Ti$ and $Ni_3Al$. Such intermetallic compounds can strengthen the alloy. Shaped articles having high strength can be produced using raw powder made of this alloy despite the fact that the rapid melt-quenching solidification process is used. From the viewpoint of the strength of shaped articles, the content of Ni in the alloy is preferably 15.0% by mass or more, more preferably 16.0% by mass or more, particularly more preferably 17.0% by mass or more. Ni is an austenitizing element. Addition of a large amounts of Ni inhibits martensitic transformation. In order not to inhibit the martensitic transformation, the content of Ni is preferably 21.0% by mass or less, more preferably 20.0% by mass or less, particularly more preferably 19.5% by mass or less. Accordingly, the content of Ni is preferably 15.0% to 21.0% by mass, more preferably 16.0% to 20.0% by mass, further more preferably 17.0% to 19.5% by mass.

[Molybdenum (Mo)]

Mo is an optional element that forms an intermetallic compound with Fe in the Fe-based alloy. A typical intermetallic compound is $Fe_2Mo$. Mo further forms an intermetallic compound with Ni. A typical intermetallic compound is $Ni_3Mo$. Such intermetallic compounds strengthen the alloy. Shaped articles having high strength can be produced using raw powder made of this alloy despite the fact that the rapid melt-quenching solidification process is used. From the viewpoint of the strength of shaped articles, the content of Mo in the alloy is preferably 2.0% by mass or more, more preferably 2.5% by mass or more, particularly more preferably 3.0% by mass or more. The addition of a large amount of Mo facilitates the formation of δ ferrite phase. In order to prevent the formation of δ ferrite phase, the content of Mo is preferably 7.0% by mass or less, more preferably 6.0% by mass or less, particularly more preferably 5.0% by mass or less. However, the content of Mo may be substantially 0%, provided that the desired properties in the present invention can be achieved. Accordingly, the content of Mo is preferably 0% to 7.0% by mass, more preferably 2.0% to 7.0% by mass, further more preferably 2.5% to 6.0% by mass, particularly more preferably 3.0% to 5.0% by mass.

[Titanium (Ti)]

Ti is an essential element that forms an intermetallic compound with Ni in the Fe-based alloy. A typical intermetallic compound is $Ni_3Ti$. The intermetallic compound enhances the creep rupture strength of the alloy. The intermetallic compound also enhances the oxidation resistance of the alloy. Shaped articles having high durability can be produced using raw powder made of this alloy despite the fact that the rapid melt-quenching solidification process is used. From the viewpoint of high durability of shaped articles, the content of Ti in the alloy is preferably 0.1% by mass or more, more preferably 0.5% by mass or more, particularly more preferably 2.0% by mass or more. A large amount of Ti readily causes hot cracking during the rapid melt-quenching solidification process. In order to prevent the hot cracking, the content of Ti is preferably 6.0% by mass or less, more preferably 5.0% by mass or less, particularly more preferably 4.0% by mass or less. Accordingly, the content of Ti is preferably 0.1% to 6.0% by mass, more preferably 0.5% to 5.0% by mass, further more preferably 2.0% to 4.0% by mass.

[Aluminum (Al)]

Al is an essential element that forms an intermetallic compound with Ni in the Fe-based alloy. A typical intermetallic compound is $Ni_3Al$. The intermetallic compound enhances the creep rupture strength of the alloy. The intermetallic compound also enhances the oxidation resistance of the alloy. Shaped articles having high durability can be produced using raw powder made of this alloy despite the fact that the rapid melt-quenching solidification process is used. From the viewpoint of high durability of shaped articles, the content of Al in the alloy is preferably 0.1% by mass or more, more preferably 0.3% by mass or more, particularly more preferably 0.5% by mass or more. A large amount of Al readily causes hot cracking in the rapid melt-quenching solidification process. In order to prevent the hot cracking, the content of Al is preferably 3.0% by mass or less, more preferably 2.5% by mass or less, particularly more preferably 2.0% by mass or less. Accordingly, the content of Al is preferably 0.1% to 3.0% by mass, more preferably 0.3% to 2.5% by mass, further more preferably 0.5% to 2.0% by mass.

[Mean Particle Diameter]

From the viewpoint of high productivity of shaped articles, the metal powder has a mean particle diameter D50 of preferably 15 μm to 50 μm, particularly preferably 20 μm to 30 μm. In the measurement of mean particle diameter D50, the cumulative curve of particles is given where the total volume of the powder is 100%, and the particle diameter at the point where the cumulative volume in the curve is 50% is determined to be D50. The particle diameter D50 is measured by laser diffraction scattering. Suitable devices for this measurement include "Microtrack MT3000" (a laser diffraction/scattering type particle size distribution measuring device) available from Nikkiso Co., Ltd. Powder and water are poured into the cell in this device, and the particle diameter is determined based on light scattering behaviors on the particles.

[Tap Density]

From the viewpoint of high productivity of shaped articles, the metal powder has a tap density TD of preferably 0.10 $Mg/m^3$ to 0.40 $Mg/m^3$, particularly preferably from 0.15 $Mg/m^3$ to 0.35 $Mg/m^3$. A method of measuring the tap density TD will be described later in detail.

[D50/TD]

The ratio (D50/TD), which is the ratio of the mean particle diameter D50 (μm) to the tap density TD ($Mg/m^3$), is preferably 0.2 to 20. A metal powder having a ratio (D50/TD) of 0.2 or more has high fluidity and can lead to a high-density shaped article. In this respect, the ratio (D50/TD) is more preferably 2 or higher, particularly more preferably 5 or higher. Particles of the metal powder having a ratio (D50/TD) of 20 or less can be sufficiently melted by rapid heating. In this respect, the ratio (D50/TD) is more preferably 15 or lower, particularly more preferably 12 or lower. Accordingly, the ratio (D50/TD) is preferably 0.2 to 20, more preferably 2 to 15, further more preferably 5 to 12.

[Shaping]

Various shaped articles can be manufactured from the metal powder according to the present invention. A method of manufacturing a shaped article comprises the steps of:

(1) preparing metal powder, and (2) melting and then solidifying the metal powder to give a non-heated shaped article.

The step of melting and then solidifying the metal powder includes a rapid melt-quenching solidification process. Specific examples of the process include a three-dimensional additive manufacturing method, a thermal spraying method, a laser coating method, and a surfacing method. In particular, the inventive metal powder is suitable for the three-dimensional additive manufacturing method.

3D printers can be used for this additive manufacturing method. In the additive manufacturing method, the spread metal powder is irradiated with a laser beam or an electron beam. Upon irradiation, the particles in the powder are rapidly heated to rapidly melt and then to rapidly solidify. The particles are bonded to each other through the melting and the subsequent solidification. Irradiation is selectively applied to some portions of the metal powder. The unirradiated portions of the powder do not melt. A bonded layer is formed only in the irradiated portions.

Additional metal powder is spread over the bonded layer. This metal powder is also irradiated with a laser beam or an electron beam. Upon irradiation, the particles in the powder rapidly melt and then rapidly solidify. The particles in the powder are bonded to each other through the melting and the subsequent solidification, and a fresh bonded layer is formed. The fresh bonded layer is also connected to the bonded layer formerly formed.

Repetition of bonding by irradiation can gradually grow an aggregate of the bonded layers. This stepwise growth leads to a three-dimensional shaped article. This additive manufacturing method facilitates production of the complicatedly shaped article.

[Hardness of Shaped Article]

The Rockwell hardness HRC of shaped articles is preferably 30 to 40 just after being formed, i.e., in the non-heated state. A shaped article with a Rockwell hardness HRC of 30 or more has high strength. In this respect, the Rockwell hardness HRC is particularly preferably 32 or higher. A shaped article with a Rockwell hardness HRC of 40 or lower has a small number of internal defects, such as cracks. In this respect, the Rockwell hardness HRC is particularly preferably 38 or lower. Accordingly, the Rockwell hardness HRC of the non-heated shaped article is preferably 30 to 40, more preferably 32 to 38. A method for measuring the Rockwell hardness HRC will be described later in detail.

[Heating]

The method of manufacturing the shaped articles further preferably comprises the step of:

(3) heating the non-heated shaped article given in the step (2) to produce a shaped article.

This step (3) preferably comprises the substeps of:
(3-1) solutionizing the non-heated shaped article, and
(3-2) aging the solutionized shaped article.

The solutionizing process can generate a supersaturated martensite structure. The aging process can precipitate Ni$_3$Mo, Ni$_3$Ti and Ni$_3$Al in the martensite matrix. The precipitation of such intermetallic compounds leads to a shaped article having superior strength and toughness.

The solutionizing temperature is preferably 700° C. to 900° C. The solutionization at 700° C. or higher causes growth of a martensitic structure that the alloying elements are sufficiently solid-soluted. In this respect, the solutionizing temperature is more preferably 730° C. or higher, particularly more preferably 750° C. or higher. The solutionization at 900° C. or lower causes retardation of embrittlement of the structure. In this respect, the solutionizing temperature is more preferably 870° C. or lower, particularly more preferably 850° C. or lower. Accordingly, the solutionizing temperature is preferably 700° C. to 900° C., more preferably 730° C. to 870° C., further more preferably 750° C. to 850° C.

The solutionizing time is preferably 1.0 hour to 3.0 hours. The solutionization for 1.0 hour or longer causes growth of a martensitic structure that the alloying elements are sufficiently solid-soluted. In this respect, the solutionizing time is more preferably 1.3 hours or longer, particularly more preferably 1.5 hours or longer. The solutionization for 3.0 hours or shorter can save energy costs. In this respect, the solutionizing time is more preferably 2.7 hours or shorter, particularly more preferably 2.5 hours or shorter. Accordingly, the solutionizing time is 1.0 to 3.0 hours, more preferably 1.3 to 2.7 hours, further more preferably 1.5 to 2.5 hours.

The aging temperature is preferably 450° C. to 550° C. The aging at 450° C. or higher causes growth of a structure that Ni$_3$Mo, Ni$_3$Ti and Ni$_3$Al are sufficiently precipitated. In this respect, the aging temperature is more preferably 460° C. or higher, particularly more preferably 470° C. or higher. In the aging at 550° C. or lower, solid solution of the alloying elements in the matrix is restrained. In this respect, the aging temperature is more preferably 540° C. or lower, particularly more preferably 530° C. or lower. Accordingly, the aging temperature is preferably 450° C. to 550° C., more preferably 460° C. to 540° C., further more preferably 470° C. to 530° C.

The aging time is preferably 3.0 hours to 6.0 hours. The aging for 3.0 hours or longer causes growth of a structure having Ni$_3$Mo, Ni$_3$Ti and Ni$_3$Al that are sufficiently precipitated. In this respect, the aging time is more preferably 3.3 hours or longer, particularly more preferably 3.5 hours or longer. The aging for 6.0 hours or shorter can save energy costs. In this respect, the aging time is more preferably 5.7 hours or shorter, particularly preferably 5.5 hours or shorter. Accordingly, the aging time is preferably 3.0 hours to 6.0 hours, more preferably 3.3 hours to 5.7 hours, further more preferably 3.5 hours to 5.5 hours.

[Physical Properties of Shaped Articles After Heating]

The shaped article after heating preferably has a Rockwell hardness HRC of 50 to 60. A shaped article having a Rockwell hardness HRC of 50 or higher exhibits superior strength. In this respect, the particularly preferred Rockwell hardness HRC is 52 or higher. A shaped article having a Rockwell hardness HRC of 60 or lower exhibits superior toughness. The product formed of this shaped article has superior durability. In this respect, the Rockwell hardness HRC is particularly preferably 58 or lower. Accordingly, the shaped article after heating has a Rockwell hardness HRC of preferably 50 to 60, particularly preferably 52 to 58.

In the shaped article after heating, value V1 and value V2 are respectively calculated by the following expressions:

$$V1=(A_{TH}/A_{TR})\times(C_{TH}/C_{TR}), \text{ and}$$

$$V2=(B_{TH}/B_{TR})\times(C_{TH}/C_{TR}).$$

In these expressions, $A_{TH}$ represents tensile strength at 400° C., $A_{TR}$ represents tensile strength at 25° C., $B_{TH}$ represents 0.2% proof stress at 400° C., $B_{TR}$ represents 0.2% proof stress at 25° C., $C_{TH}$ represents elongation at break at 400° C., and $C_{TR}$ represents elongation at break at 25° C. In this shaped article, the value V1 is preferably 1.5 to 3.5, and the value V2 is preferably 1.5 to 3.5. In other words, the shaped article preferably satisfies the following mathematical expressions (I) and (II):

$$1.5 \leq (A_{TH}/A_{TR})\times(C_{TH}/C_{TR}) \leq 3.5 \quad \text{(I), and}$$

$$1.5 \leq (B_{TH}/B_{TR})\times(C_{TH}/C_{TR}) \leq 3.5 \quad \text{(II).}$$

A shaped article having a value V1 of 1.5 or more and a value V2 of 1.5 or more exhibits superior strength and durability under high-temperature environment. In this respect, the value V1 and the value V2 are more preferably 1.8 or more, particularly more preferably 2.0 or more. A shaped article having the values V1 and V2 of 3.5 or less can be readily produced. In this respect, the values V1 and V2 are particularly preferably 3.3 or less. Accordingly, the values V1 and V2 are preferably 1.5 to 3.5, more preferably 1.8 to 3.5, particularly more preferably 2.0 to 3.3.

EXAMPLES

The following examples will clarify the advantages of the present invention, although the present invention should not be construed as being limited based on the description of the examples.

Raw materials were provided having the compositions shown in Tables 1 to 3 below. Each raw material was heated in an alumina crucible by high-frequency induction to give a molten alloy. The molten alloy was dropped down through a nozzle having a diameter of 5 mm provided at the bottom of the crucible, and high-pressurized argon gas was injected into the molten alloy. The gas injection finely crashed and quenched the molten alloy to form powder. The powder was classified such that each particle had a diameter of 63 μm or less to prepare Fe-based metal powders in the examples and comparative examples.

Non-heated shaped articles were produced from the metal powders with a three-dimensional additive manufacturing device (trade name: "EOS-M280"). The non-heated shaped articles underwent heating under the conditions shown in Tables 1 to 3 below.

[Measurement of Hardness]

A test piece of 10 mm square (10 mm by 10 mm by 10 mm) was prepared, and a basic load of 10 kgf was applied to the test face with an indenter, the indenter being a steel ball provided with a diamond tip having a radius of 0.2 mm. A total load of 110 kgf where a test load of 100 kgf was added to the basic load was then applied to the test piece, and the test piece was plastically deformed. The load was then released down to the basic load of 10 kgf, and the depth of permanent recess was measured from the reference face. Based on this depth, the Rockwell hardness HRC was calculated using a conversion expression. The measurement was performed before and after the heating. The results are as shown in Tables 1 to 3 below.

[Tensile Properties at Room Temperature]

A plurality of Φ5 test pieces (Φ5×GL: gauge length 25 mm) was prepared in accordance with JIS No. 14A and subjected to a tensile test in accordance with JIS standard. The maximum tensile stress σ (σ=measured load F/cross-sectional area S) applied during the test indicates tensile strength. The load and elongation were plotted on a graph, and a straight line offset by 0.2% of the GL was drawn in parallel with the elastic region, and the stress at the intersection with the load curve was calculated as 0.2% proof stress. The elongation Z was calculated based on the following expression:

$$Z=(Lf-L0)/L0\times100.$$

In this expression, L0 is the initial gauge length and Lf is the gauge length at fracture. The results are as shown in Tables 1 to 3 below.

[Tensile Properties at High Temperature]

Test pieces (Φ6×GL30 mm) of JIS G 0567, type I-6 were prepared and subjected to the same tensile test procedure at 760° C. to calculate the tensile strength, 0.2% proof stress and elongation. The results are as shown in Tables 1 to 3 below.

[Measurement of Particle Diameter Distribution]

The mean particle diameter D50 was measured by "Microtrack MT3000" (a laser diffraction/scattering type particle diameter distribution measuring device) as described above. The results are as shown in Tables 1 to 3 below.

[Tap Density]

The tap density was measured in accordance with JIS Z 2512. In the measurement, approximately 50 g of metal powder was filled into a cylinder having a volume of 100 cm³, and the density was measured. The measuring conditions are as follows.

Drop height: 10 mm
Number of taps: 200

The results are as shown in Tables 1 to 3 below.

[Rating]

Each of metal powder was rated into Ranks 1 to 5 based on the following criteria.

[Rank 1]
Hardness just after shaping: HRC 30 to 40
Hardness after heating: HRC 50 to 60
D50/TD: 0.2 to 20
$(A_{TH}/A_{TR})\times(C_{TH}/C_{TR})$: 3.0 to 3.3
$(B_{TH}/B_{TR})\times(C_{TH}/C_{TR})$: 3.0 to 3.3

[Rank 2]
Hardness just after shaping: HRC 30 to 40
Hardness after heating: HRC 50 to 60
D50/TD: 0.2 to 20
$(A_{TH}/A_{TR})\times(C_{TH}/C_{TR})$: 2.0 to less than 3.0
$(B_{TH}/B_{TR})\times(C_{TH}/C_{TR})$: 2.0 to less than 3.0

[Rank 3]
Hardness just after shaping: HRC 30 to 40
Hardness after heating: HRC 50 to 60
D50/TD: 0.2 to 20
$(A_{TH}/A_{TR})\times(C_{TH}/C_{TR})$: 1.8 to less than 2.0
$(B_{TH}/B_{TR})\times(C_{TH}/C_{TR})$: 1.8 to less than 2.0

[Rank 4]
At least one of the following items (a) to (e) is satisfied.
(a) Hardness just after shaping: smaller than HRC 30 or larger than HRC 40
(b) Hardness after heating: smaller than HRC 50 or larger than HRC 60
(c) D50/TD: less than 0.2 or more than 20
(d) $(A_{TH}/A_{TR})\times(C_{TH}/C_{TR})$: 1.5 to less than 1.8 or more than 3.3 to 3.5
(e) $(B_{TH}/B_{TR})\times(C_{TH}/C_{TR})$: 1.5 to less than 1.8 or more than 3.3 to 3.5

[Rank 5]
At least one of the following items (a) and (b) is satisfied.
(a) $(A_{TH}/A_{TR})\times(C_{TH}/C_{TR})$: less than 1.5
(b) $(B_{TH}/B_{TR})\times(C_{TH}/C_{TR})$: less than 1.5

TABLE 1

| | Composition (% by mass) | | | | | Hardness (HRC) | | Heating conditions | | | | | | |
| | | | | | | | | Solutionization | | Aging | | | | | |
| | Ni | Co | Mo | Ti | Al | After shaping | After heating | Temp. (° C.) | hrs | Temp. (° C.) | hrs | D50/TD | V1 | V2 | Rank |
|---|---|---|---|---|---|---|---|---|---|---|---|---|---|---|---|
| Ex. 1 | 19.0 | — | 7.0 | 0.5 | 0.5 | — | — | 700 | 1 | 550 | 5 | 11 | 1.6 | 1.8 | 4 |
| Ex. 2 | 18.7 | 0.21 | — | 0.4 | 0.6 | — | — | 700 | 1 | 550 | 5 | 8 | 2.0 | 2.1 | 4 |
| Ex. 3 | 18.9 | 0.20 | 3.4 | 0.5 | 0.6 | 35.1 | 54.7 | 700 | 2 | 550 | 4 | 8 | 2.1 | 2.0 | 2 |
| Ex. 4 | 18.8 | — | 4.6 | 6.0 | 0.1 | — | — | 700 | 2 | 500 | 4 | 11 | 2.4 | 2.2 | 4 |
| Ex. 5 | 19.0 | 0.22 | 4.4 | 0.1 | 0.2 | — | — | 700 | 3 | 500 | 3 | 20 | 2.0 | 1.8 | 4 |
| Ex. 6 | 19.1 | 0.21 | 4.7 | 3.2 | 0.1 | 36.3 | 53.1 | 700 | 3 | 500 | 3 | 9 | 1.9 | 1.9 | 3 |
| Ex. 7 | 18.7 | — | 4.6 | 2.9 | 3.0 | 39.5 | 58.6 | — | — | — | — | 0.2 | 3.5 | 3.1 | 1 |
| Ex. 8 | 18.9 | 0.20 | 4.5 | 3.1 | 0.1 | 32.4 | 51.2 | 800 | 1 | 450 | 3 | 8 | 2.8 | 2.5 | 2 |
| Ex. 9 | 19.4 | — | 4.8 | 3.0 | 1.6 | 36.7 | 55.4 | 800 | 1 | 450 | 3 | 5 | 3.3 | 3.2 | 1 |
| Ex. 10 | 19.0 | 0.50 | 4.3 | 2.8 | 0.4 | 33.4 | 56.3 | 800 | 2 | 450 | 4 | — | 1.6 | 1.5 | 4 |
| Ex. 11 | 18.8 | 0.01 | 4.5 | 2.8 | 0.5 | 38.4 | 54.0 | 800 | 2 | 530 | 4 | — | 1.5 | 1.5 | 4 |
| Ex. 12 | 18.9 | — | 4.9 | 2.9 | 0.3 | 30.9 | 51.2 | 800 | 3 | 530 | 6 | 7 | 1.7 | 2.0 | 4 |
| Ex. 13 | 21.0 | — | 4.6 | 3.2 | 0.7 | 36.4 | 53.4 | 800 | 3 | 530 | 6 | 9 | 2.3 | 2.1 | 2 |
| Ex. 14 | 15.0 | 0.22 | 4.7 | 3.3 | 0.6 | 39.8 | 56.7 | 800 | 1 | 480 | 4 | 11 | 1.6 | 1.7 | 4 |
| Ex. 15 | 18.2 | 0.21 | 4.3 | 3.5 | 0.7 | 34.2 | 54.1 | 800 | 1 | 480 | 4 | 4 | 2.7 | 3.3 | 2 |
| Ex. 16 | 18.0 | — | 4.5 | 2.0 | 0.2 | 34.5 | 55.0 | 800 | 1 | 480 | 3 | 12 | 3.3 | 3.0 | 1 |
| Ex. 17 | 18.5 | 0.25 | 2.6 | 4.6 | 1.5 | 35.5 | 56.3 | 900 | 2 | 550 | 3 | 8 | 1.8 | 1.6 | 4 |
| Ex. 18 | 18.6 | 0.45 | 2.1 | 4.7 | 1.4 | 38.0 | 53.7 | 900 | 2 | 550 | 5 | 9 | 2.0 | 2.7 | 2 |
| Ex. 19 | 19.0 | 0.15 | 3.4 | 4.3 | 1.1 | 38.7 | 57.6 | 900 | 2 | 530 | 5 | 20 | 1.9 | 1.9 | 3 |
| Ex. 20 | 16.4 | 0.30 | 4.4 | 1.5 | 0.2 | 30.0 | 50.0 | 900 | 3 | 530 | 5 | 18 | 1.5 | 1.7 | 4 |

V1: $(A_{TH}/A_{TR}) \times (C_{TH}/C_{TR})$
V2: $(B_{TH}/B_{TR}) \times (C_{TH}/C_{TR})$

TABLE 2

| | Composition (% by mass) | | | | | Hardness (HRC) | | Heating conditions | | | | | | | |
| | | | | | | | | Solutionization | | Aging | | | | | |
| | Ni | Co | Mo | Ti | Al | After shaping | After heating | Temp. (° C.) | hrs | Temp. (° C.) | hrs | D50/TD | V1 | V2 | Rank |
|---|---|---|---|---|---|---|---|---|---|---|---|---|---|---|---|
| Ex. 21 | 17.2 | — | 4.2 | 1.7 | 0.3 | 35.8 | 53.4 | 900 | 3 | 500 | 4 | 15 | 2.4 | 2.0 | 2 |
| Ex. 22 | 16.8 | 0.27 | 4.6 | 1.9 | 0.7 | 36.4 | 50.8 | 900 | 3 | 500 | 4 | 11 | 2.9 | 2.5 | 2 |
| Ex. 23 | 20.1 | 0.04 | 6.5 | 5.7 | 0.1 | 40.0 | 60.0 | 900 | 2 | 480 | 4 | 5 | 3.5 | 3.5 | 4 |
| Ex. 24 | 20.5 | — | 6.4 | 4.8 | 2.8 | — | — | — | — | — | — | 6 | 3.5 | 3.5 | 4 |
| Ex. 25 | 20.4 | 0.03 | 6.8 | 0.1 | 2.7 | 34.9 | 54.3 | 900 | 2 | 450 | 3 | 5 | 2.6 | 2.2 | 2 |
| Ex. 26 | 18.3 | 1.05 | 4.5 | 0.2 | 2.7 | 35.7 | 55.9 | 700 | 1 | 550 | 3 | 15 | 1.8 | 2.0 | 3 |
| Ex. 27 | 20.5 | 0.98 | 6.8 | 4.5 | 0.3 | 33.3 | 53.8 | 700 | 1 | 550 | 3 | 13 | 1.6 | 2.1 | 4 |
| Ex. 28 | 18.5 | 3.06 | 5.0 | 1.1 | 1.0 | 34.2 | 53.6 | 700 | — | 550 | 6 | 10 | 1.9 | 1.9 | 3 |
| Ex. 29 | 20.3 | 3.02 | 6.5 | 4.6 | 0.5 | — | — | 700 | — | 550 | 6 | 11 | 2.2 | 2.3 | 4 |
| Ex. 30 | 19.0 | 5.11 | 4.6 | 2.7 | 0.6 | 35.6 | 57.2 | 800 | 3 | 480 | 3 | 5 | 1.9 | 1.8 | 3 |
| Ex. 31 | 20.7 | 5.06 | 6.7 | 4.3 | 1.0 | 36.0 | 54.7 | 800 | 3 | 480 | 3 | 4 | 1.7 | 1.6 | 4 |
| Ex. 32 | 17.9 | 7.15 | 5.3 | 3.5 | 2.5 | — | — | 800 | 3 | 480 | 6 | 2 | 1.5 | 1.5 | 4 |
| Ex. 33 | 20.3 | 7.08 | 5.5 | 4.0 | 0.3 | 38.4 | 57.8 | 800 | 3 | 480 | 6 | 12 | 2.3 | 2.4 | 2 |
| Ex. 34 | 18.5 | 9.87 | 6.2 | 0.2 | 0.5 | 39.8 | 59.5 | 900 | — | 480 | — | 10 | 2.8 | 2.9 | 2 |
| Ex. 35 | 20.5 | 10.00 | 4.7 | 3.8 | 3.0 | — | — | 900 | — | 480 | — | 8 | 3.0 | 3.3 | 4 |
| Comp. Ex. 1 | 19.1 | 0.21 | 10.4 | 0.4 | 0.5 | 33.5 | 52.1 | 800 | 2 | 700 | 1 | 12 | 1.4 | 1.4 | 5 |
| Comp. Ex. 2 | 18.4 | 0.22 | 7.2 | 0.3 | 0.5 | 28.9 | 46.3 | 800 | 2 | 700 | 3 | 7 | 1.4 | 0.9 | 5 |
| Comp. Ex. 3 | 18.8 | 0.18 | 9.5 | 0.2 | 0.7 | 36.4 | 55.9 | 800 | 2 | 700 | 10 | 6 | 0.8 | 1.0 | 5 |
| Comp. Ex. 4 | 19.3 | 0.18 | 4.5 | 10.0 | 0.2 | 38.4 | 56.4 | 800 | 2 | 300 | 1 | 10 | 1.1 | 1.2 | 5 |
| Comp. Ex. 5 | 18.5 | 0.20 | 4.6 | 0.05 | 0.1 | 29.4 | 47.6 | 800 | 2 | 300 | 3 | 25 | 1.1 | 1.2 | 5 |

V1: $(A_{TH}/A_{TR}) \times (C_{TH}/C_{TR})$
V2: $(B_{TH}/B_{TR}) \times (C_{TH}/C_{TR})$

TABLE 3

| | Composition (% by mass) | | | | | Hardness (HRC) | | Heating conditions | | | | | | | |
| | | | | | | | | Solutionization | | Aging | | | | | |
| | Ni | Co | Mo | Ti | Al | After shaping | After heating | Temp. (° C.) | hrs | Temp. (° C.) | hrs | D50/TD | V1 | V2 | Rank |
|---|---|---|---|---|---|---|---|---|---|---|---|---|---|---|---|
| Comp. Ex. 6 | 18.6 | 0.23 | 4.8 | 8.4 | 0.1 | 37.1 | 52.3 | 800 | 2 | 300 | 10 | 3 | 1.2 | 1.4 | 5 |
| Comp. Ex. 7 | 18.3 | 0.17 | 5.0 | 2.8 | 5.2 | 44.5 | 59.6 | 800 | 2 | 500 | 3 | 0.1 | 0.8 | 0.9 | 5 |
| Comp. Ex. 8 | 19.0 | 0.19 | 5.1 | 3.0 | 0.03 | 39.4 | 57.6 | 800 | 2 | 500 | 3 | 6 | 1.2 | 1.3 | 5 |
| Comp. Ex. 9 | 18.5 | 0.15 | 4.9 | 3.2 | 3.2 | 41.2 | 58.6 | 800 | 2 | 500 | 3 | 2 | 1.3 | 1.7 | 5 |
| Comp. Ex. 10 | 19.1 | 10.30 | 4.2 | 2.9 | 0.5 | 43.5 | 56.8 | 800 | 2 | 500 | 3 | 8 | 1.1 | 1.5 | 5 |
| Comp. Ex. 11 | 31.3 | 0.20 | 4.5 | 3.1 | 0.5 | 25.7 | 52.4 | 800 | 2 | 500 | 3 | 0.8 | 1.1 | 0.7 | 5 |
| Comp. Ex. 12 | 10.4 | 0.14 | 3.9 | 3.0 | 0.9 | 42.4 | 48.6 | 800 | 2 | 500 | 3 | 11 | 1.1 | 1.8 | 5 |
| Comp. Ex. 13 | 22.5 | 0.03 | 4.2 | 3.2 | 1.0 | 40.5 | 45.6 | 800 | 2 | 500 | 3 | 6 | 1.7 | 1.4 | 5 |
| Comp. Ex. 14 | 17.8 | 11.30 | 10.5 | 3.5 | 0.1 | 51.4 | 62.3 | 800 | 2 | 500 | 3 | 10 | 0.6 | 0.8 | 5 |
| Comp. Ex. 15 | 17.9 | 15.40 | 7.2 | 4.9 | 1.6 | 50.7 | 63.7 | 800 | 1 | 500 | 3 | 6 | 1.0 | 1.2 | 5 |
| Comp. Ex. 16 | 19.0 | 0.02 | 15.3 | 4.5 | 1.7 | 45.1 | 55.4 | 800 | 5 | 500 | 3 | 4 | 1.3 | 1.1 | 5 |
| Comp. Ex. 17 | 18.6 | 0.05 | 8.1 | 4.2 | 1.0 | 33.4 | 51.9 | 800 | 10 | 500 | 3 | 0.5 | 0.6 | 0.7 | 5 |
| Comp. Ex. 18 | 30.0 | 0.28 | 4.3 | 0.03 | 0.1 | 30.6 | 48.7 | 500 | 2 | 500 | 3 | 18 | 1.1 | 1.3 | 5 |
| Comp. Ex. 19 | 10.5 | 0.33 | 4.0 | 0.09 | 0.4 | 25.7 | 41.5 | 500 | 5 | 500 | 3 | 12 | 1.1 | 2.0 | 5 |

TABLE 3-continued

| | Composition (% by mass) | | | | | Hardness (HRC) | | Heating conditions | | | | | | | |
| | | | | | | After shaping | After heating | Solutionization | | Aging | | | | | |
| | Ni | Co | Mo | Ti | Al | | | Temp. (° C.) | hrs | Temp. (° C.) | hrs | D50/TD | V1 | V2 | Rank |
|---|---|---|---|---|---|---|---|---|---|---|---|---|---|---|---|
| Comp. Ex. 20 | 5.6 | 0.15 | 4.7 | 12.0 | 0.8 | 38.7 | 53.8 | 500 | 10 | 500 | 3 | 6 | 1.3 | 2.0 | 5 |
| Comp. Ex. 21 | 3.5 | 0.21 | 6.2 | 5.5 | 10.5 | 39.8 | 57.6 | 1000 | 2 | 500 | 3 | 5 | 0.4 | 1.2 | 5 |
| Comp. Ex. 22 | 12.8 | 0.15 | 6.0 | 5.0 | 5.6 | 42.8 | 58.4 | 1000 | 5 | 500 | 3 | 5 | 1.6 | 1.1 | 5 |
| Comp. Ex. 23 | 35.4 | 0.10 | 5.9 | 0.3 | 0.04 | 34.7 | 55.6 | 1000 | 10 | 500 | 3 | 11 | 0.4 | 0.4 | 5 |

V1: $(A_{TH}/A_{TR}) \times (C_{TH}/C_{TR})$
V2: $(B_{TH}/B_{TR}) \times (C_{TH}/C_{TR})$

[Footnotes in Tables 1 to 3]
  The sign "–" in the column of composition indicates an amount as an incidental impurity.
  The sign "–" in the column of hardness just after shaping indicates that the hardness is smaller than HRC 30 or larger than HRC 40.
  The sign "–" in the column of hardness after heating indicates that the hardness is smaller than HRC 50 or larger than HRC 60.
  The sign "–" in the column of value V1 indicates that the value is smaller than 1.5 or larger than 3.5.
  The sign "–" in the column of value V2 indicates that the value is smaller than 1.5 or larger than 3.5.
  The sign "–" in the column of the solutionizing temperature indicates that the temperature is lower than 700° C. or higher than 900° C.
  The sign "–" in the column of solutionizing time indicates that the time is shorter than 1 hour or longer than 3 hours.
  The sign "–" in the column of aging temperature indicates that the temperature is lower than 450° C. or higher than 550° C.
  The sign "–" in the column of aging time indicates that the time is shorter than 3 hours or longer than 6 hours.
  The sign "–" in the column of D50/TD ratio indicates that the ratio is smaller than 0.2 or larger than 20.

As shown in Tables 1 to 3, each powder in the Examples is superior in overall properties. These results clearly indicate the advantages of the present invention.

The powder according to the present invention is also suitable for a 3D printer that powder is ejected from a nozzle. The powder is also suitable for a laser coating method that powder is ejected from a nozzle.

The invention claimed is:

1. An Fe-based metal powder for shaping, wherein the Fe-based metal powder is made of an Fe-based alloy, comprising:
   Ni in an amount of 15.0% to 21.0% by mass;
   Co in an amount of 0% to 0.5% by mass;
   Mo in an amount of 0% to 7.0% by mass;
   Ti in an amount of 0.1% to 6.0% by mass;
   Al in an amount of 0.1% to 3.0% by mass; and
   the balance being Fe and incidental impurities.

2. The Fe-based metal powder according to claim 1, wherein D50/TD is 0.2 to 20, the D50/TD being a ratio of a mean particle diameter D50 (μm) of the metal powder to a tap density TD (Mg/m³) of the metal powder.

3. A method of producing a shaped article using a raw Fe-based metal powder, comprising the steps of:
   (1) providing Fe-based metal powder made of Fe-based alloy containing:
     Ni in an amount of 15.0% to 21.0% by mass;
     Co in an amount of 0% to 0.5% by mass;
     Mo in an amount of 0% to 7.0% by mass;
     Ti in an amount of 0.1% to 6.0% by mass;
     Al in an amount of 0.1% to 3.0% by mass; and
     the balance being Fe and incidental impurities, and
   (2) melting and then solidifying the Fe-based metal powder to produce a solidified shaped article.

4. The method according to claim 3, wherein the solidified shaped article has a Rockwell hardness of 30 to 40.

5. The method according to claim 3, further comprising, subsequent to step (2), the step of:
   (3) heating the solidified shaped article to produce a shaped article.

6. The method according to claim 5, wherein step (3) comprises the substeps of:
   (3-1) solutionizing the solidified shaped article; and
   (3-2) aging the solutionized shaped article.

7. The method according to claim 6, wherein substep (3-1) is performed at a temperature of 700 to 900° C. for a period of 1.0 to 3.0 hours, and substep (3-2) is performed at a temperature of 450 to 550° C. for a period of 3.0 to 6.0 hours.

8. The method according to claim 5, wherein the shaped article after step (3) has a Rockwell hardness of 50 to 60.

9. The method according to claim 5, wherein the shaped article after step (3) satisfies the following expressions (I) and (II):

$$1.5 \leq (A_{TH}/A_{TR}) \times (C_{TH}/C_{TR}) \leq 3.5 \quad \text{(I), and}$$

$$1.5 \leq (B_{TH}/B_{TR}) \times (C_{TH}/C_{TR}) \leq 3.5 \quad \text{(II),}$$

where, $A_{TH}$ represents tensile strength at 400° C., $A_{TR}$ represents tensile strength at 25° C., $B_{TH}$ represents 0.2% proof stress at 400° C., $B_{TR}$ represents 0.2% proof stress at 25° C., $C_{TH}$ represents elongation at break at 400° C., and $C_{TR}$ represents elongation at break at 25° C.

* * * * *